United States Patent [19]

Nakamura

[11] 4,174,796
[45] Nov. 20, 1979

[54] REAR CARRIER DEVICE ON MOTORCYCLES AND THE LIKE

[75] Inventor: Nagatoshi Nakamura, Wako, Japan

[73] Assignee: Honda Giken Kogyo Kabushiki Kaisha, Tokyo, Japan

[21] Appl. No.: 867,192

[22] Filed: Jan. 5, 1978

[30] Foreign Application Priority Data

Jan. 19, 1977 [JP] Japan .............................. 52/4981[U]
Jan. 19, 1977 [JP] Japan .............................. 52/4982[U]

[51] Int. Cl.² ............................................... B62J 7/04
[52] U.S. Cl. .................................... 224/39; 224/33 R
[58] Field of Search .................... 224/39, 40, 41, 32 A, 224/32 R, 30 R, 30 A, 31, 33 R, 33 A, 37, 38; 280/202, 289 R, 289 A

[56] References Cited

U.S. PATENT DOCUMENTS

| 3,791,563 | 2/1974 | Raat | 224/30 R X |
| 3,850,353 | 11/1974 | Foulds | 224/30 R X |
| 3,948,424 | 4/1976 | Hunn et al. | 224/30 A X |

FOREIGN PATENT DOCUMENTS

| 895412 | 11/1953 | Fed. Rep. of Germany | 224/40 |
| 934089 | 10/1955 | Fed. Rep. of Germany | 224/39 |
| W 11606 | 4/1956 | Fed. Rep. of Germany | 224/39 |
| 1132104 | 3/1957 | France | 224/39 |

Primary Examiner—Robert J. Spar
Assistant Examiner—Jerold M. Forsberg
Attorney, Agent, or Firm—Irving M. Weiner; Pamela S. Burt; Melvin Yedlin

[57] ABSTRACT

A rear carrier device for use on motorcycles and other types of cycles. The device is connected in its front end parts to the right and left upper fitting parts of the rear shock absorber units of the motorcycle. The intermediate part, or a portion of the rear part of the device is provided with a suspended part connected to the rear fender of the motorcycle. In this manner, the rear carrier device is fitted and connected to a motorcycle in only three places. The rear carrier device is also adapted to accommodate various size loads to be carried, by means of a pivotable sub-part thereof.

7 Claims, 10 Drawing Figures

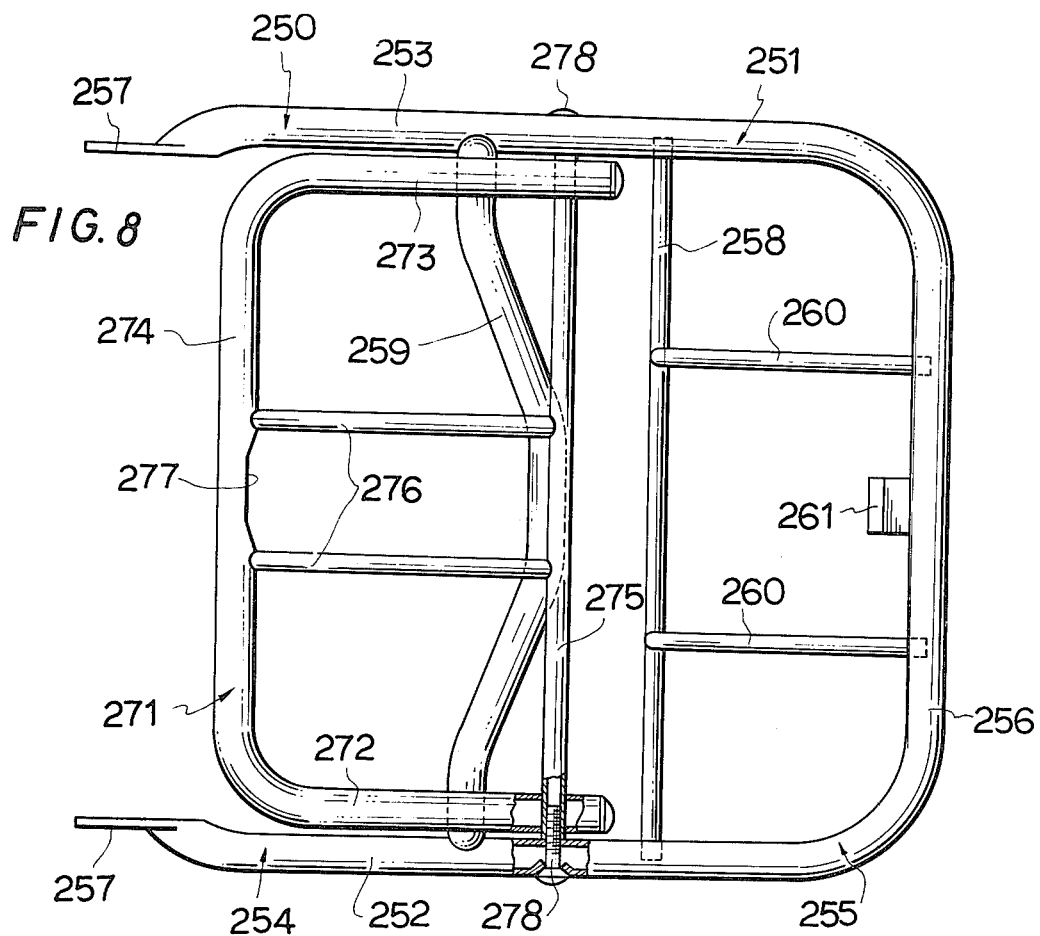
FIG. 8
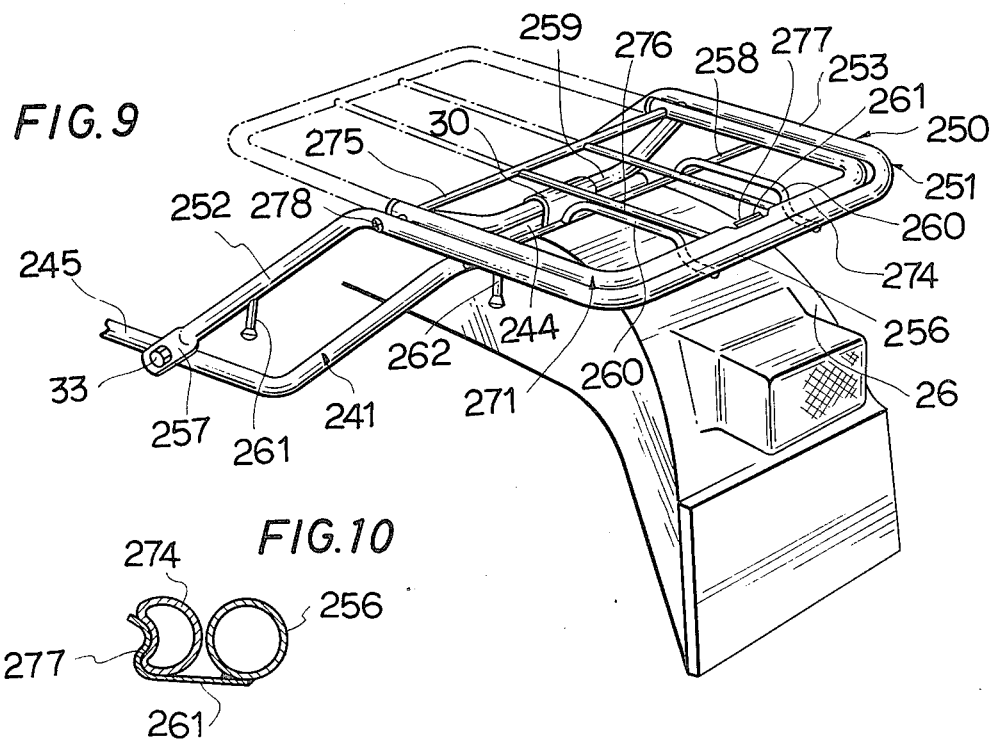
FIG. 9
FIG. 10

REAR CARRIER DEVICE ON MOTORCYCLES AND THE LIKE

FIELD OF THE INVENTION

The present invention relates to improvements in rear carrier devices for use on motorycles and other types of cycles.

More particularly, the invention relates to a rear carrier device for use on motorcycles and the like which is connected in the front end parts of a substantially U-shaped bent part to the motorcycle frame sides, integrally with the upper fitting parts of the right and left rear cushion or shock absorber units, or the like, of a motorcycle. The device is provided in the intermediate part or a portion of the rear part thereof with a suspended part connected onto the rear fender of the motorcycle, so as to be simple to fit and effectively supported. The device has a sub-part of the same contour rotatably pivoted to the generally U-shaped bent part so that the sub-part may be made to fall on the seat side as required, to freely set the load carrying area to be large at any time. The normally contradictory problems of compacting the rear carrier and of enlarging it as required are effectively solved by the device according to the invention.

BACKGROUND OF THE INVENTION

Rear carriers on motorcycles are commonly fitted in advance to standard types of motorcycles which are frequently used in carrying loads. Ofttimes, however, rear carriers are also found to be necessary on types of motorcycles which are not normally provided with such rear carriers, when it is desired to carry an extra load. In this latter type, such rear carriers are provided as optional parts.

In fitting a conventional rear carrier to a motorcycle, generally a flat fitting part is provided in the front end part of each of right and left stays, a fitting piece is suspended and set by welding or the like on the right and left of the intermediate part, the front end fitting part is connected to the motorcycle side in common, for example, with the motorcycle side fitting part of the rear cushion or shock absorber unit, and the fitting piece in the intermediate part on the right and left is connected by a bolt or the like to the right and left of the rear member of the motorcycle frame.

Because the above-mentioned conventional rear carrier is fitted by being connected to the motorcycle frame in four places in the front and rear and on the right and left of the intermediate part, too many connecting places are provided, and it is thus desirable to simplify the fitting, especially when the carrier is provided as an optional part to be fitted by the user himself.

Further, because fitting pieces are provided by welding or the like in two places on the right and left of the intermediate part of the rear carrier, many steps are required in making the carrier, the surfaces including such places must be treated such as by plating after welding, and the cost of the rear carrier is consequently high. In addition, the parts connected with the fitting pieces must be provided in the rear part of the motorcycle frame, with the degree of difficulty depending on the type of motorcycle, and therefore the general utility is poor. Further, in the fitting of the above-mentioned rear carrier, when it is fastened in common with the rear cushion or shock absorber unit at one end, the connecting part will not necessarily be conspicuous in appearance, but the fitting part will appear on the side surface so as to be unfavorable in appearance.

In a motorcycle of a long double-seat type, it is common to provide no rear carrier, so as to avoid interference with a rider sitting on the rear seat portion, and thus such types of motorcycles are inconvenient due to their lack of a rear carrier. Therefore, it has been considered to provide a rear carrier as an optional part to be fitted to such double-seat type of motorcycle so as to carry a load. However, it is not desirable for the rear carrier to project rearwardly beyond the entire length of the motorcycle itself. In order to carry a sufficient load without projecting the rear carrier rearwardly, the rear carrier will have to be set to be long on the seat side. Also, it is common to set the size of the rear carrier to accommodate the maximum dimension of the load to be carried, and even in the case of carrying a small load, the rear carrier will remain large.

Therefore, if the rear carrier is set as fixed not only on a motorcycle of the double-seat type as mentioned above, but also on a standard type of motorcycle, it will occupy a large area in the longitudinal direction in the rear part of the motorcycle and, even when the rear carrier is not used, it will fixedly occupy an inconveniently large area. Further, depending on the type of motorcycle, the appearance will be detrimentally affected. In a motorcycle of a double-seat type, if a rear carrier is provided fixed thereto, it will interfere with the ride of the rider on the rear seat, and if it is removed and fitted, it will also be very inconvenient.

SUMMARY OF THE INVENTION

The present invention effectively solves the above-mentioned problems attendant the conventional rear carrier device, i.e., the problems of fitting it and the problems of its general structure.

The invention provides a rear carrier device for a cycle which includes a substantially U-shaped member connected in the right and left front end parts thereof to the sides of the cycle frame, together with the fitting parts of the right and left rear cushion units of the cycle. A suspended part is provided substantially in the intermediate part or a portion of the rear part of the device, the suspended part being connected to a rear fender of the cycle.

An object of the invention is to provide a rear carrier device on motorcycles and the like which is connected on the right and left of the front end part to the motorcycle sides, integrally with the motorcycle side fitting parts of the rear cushion or shock absorber units. The device is provided in the intermediate part or a portion of the rear part with a suspended part connected to the rear fender and is thus connected to the side of the motorcycle on the right and left of the front end part and in the intermediate part or in one portion of the rear part.

Therefore, an object of the present invention is to provide a rear carrier device which is fitted and connected to the motorcycle in three places, viz, the right and left of the front part, and the intermediate part or the rear part. The device is fitted simply and easily and can also be fitted simply and easily by the user when provided as an optional part.

Another object of the present invention is to provide a rear carrier device which does not provide supporting parts in any two places on the right and left of the motorcycle frame other than the right and left of the front part. Thus, the device can be simplified in structure and is effectively supported because it is supported in the intermediate part and the middle part of the rear part on the fender of the motorcycle.

A further object of the invention is to provide a rear carrier which is connected in the front end part in common with the fitting parts of the cushion or shock absorber units and the like, and is connected in the intermediate part and rear part on the fender so that the fitting parts do not appear on the side surfaces of the rear part to detrimentally affect the appearance of the motorcycle.

Another main object of the invention is to provide a rear carrier device which has a main frame extended rearwardly of the motorcycle seat, is provided with a sub-frame rotatably pivoted on the side surfaces of this main frame, and may be housed within the rearward extension of the main frame as well as being able to fall down on the seat side by being rotated.

Therefore, an object of the present invention is to provide a carrier device which has a sub-frame housed within the rearward extension of a main frame when not in use. In the case of a small load, the device can be used as compactly as possible. The device does not interfere with the mounting and dismounting of the rider, does not interfere with a rider on the rear seat, and does not detrimentally affect the appearance of the motorcycle when it is not in use, because of its compact size.

Another object of the present invention is to provide a rear carrier device which can have the length in the longitudinal direction set at a length equal to the combination of a main frame extension and sub-frame, by making the sub-frame fall on the seat side when the load to be carried is large. The device can effectively carry even a large load and is very favorable for use in carrying such a load.

A further object of the present invention is to provide a carrier device which is very easy to extend and retract by way of the sub-frame, and can be easily selectively operated in response to the type, size, and mounting of the load to be carried. The device is of simple structure and is inexpensive, while still having the above-mentioned advantages, due to the structure of pivoting the sub-frame to the main frame extension.

Preferred embodiments of the present invention shall be explained in detail in the following, with reference to the accompanying drawings.

BRIEF DESCRIPTION OF THE DRAWINGS

FIG. 8 is a plan view of FIG. 7.

FIG. 9 is a perspective view of the rear carrier with the sub-frame housed.

FIG. 10 is a vertically sectioned view of an engaging part of the main frame and sub-frame, engaged with each other.

DETAILED DESCRIPTION OF PREFERRED EMBODIMENTS

Figure 1:
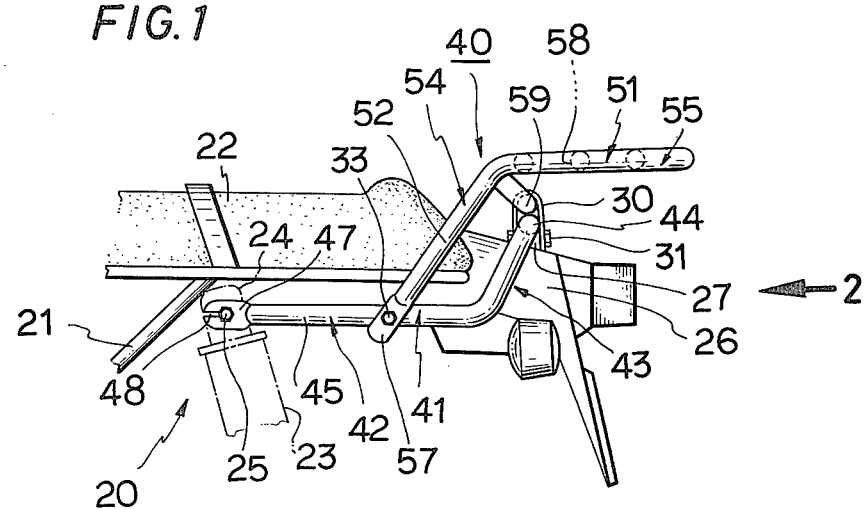
FIG. 1 depicts a side view of the rear part of a motorcycle showing the fitting of a rear carrier.
Figure 2:
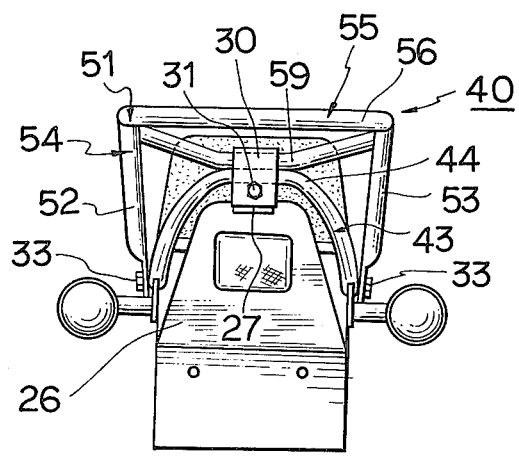
FIG. 2 shows the view of FIG. 1, as seen in the direction indicated by the arrow marked 2 in FIG. 1.
Figure 3:
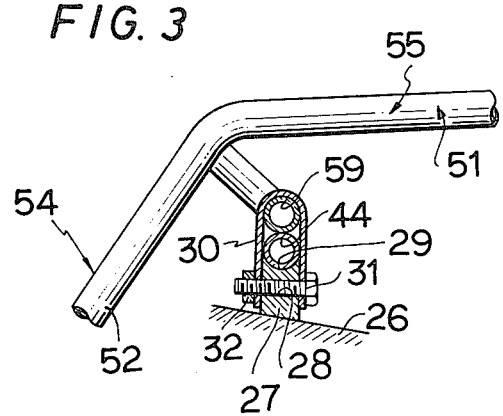
FIG. 3 is a vertically sectioned side view of a fitting part to the rear fender.

With reference to FIG. 1, there is shown the rear part of a motorcycle 20, with a rear frame part 21, a seat 22, right and left rear cushion or shock absorber units 23 connected as the lower ends to both ends of a rear wheel supporting shaft, and a rear fender 26 which extends rearwardly of seat 22.

Referring generally to FIGS. 1-4, a rear carrier 40 comprises a rear stay 41 and a carrier member 51. The rear stay 41 is formed to be generally U-shaped and bent by bending a tubular member, has a front half part 42 below the right and left of seat 22, is raised in the rear bent part 43 so as to bridge the rear part of fender 26, and has a lateral rod part 44 in the rear end part adapted to cross over the rear part of fender 26.

Figure 4:
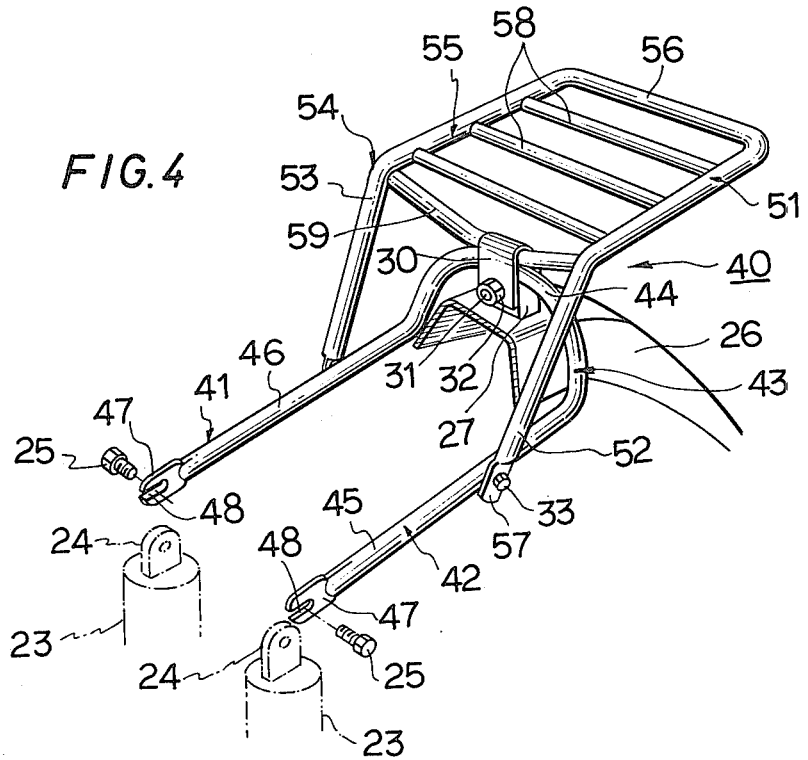
FIG. 4 is a perspective view of the rear carrier.

Rear carrier 40 is provided with side rod parts 46 and 45 on the right and left, each side rod part having a front end part which is pressed to form a flat part 47 having a slot 48 formed in the lengthwise direction (FIGS. 1 and 4). Slot 48 is fitted to a bolt 25 adapted to be received in a fitting piece 24, which is a connecting part between each of right and left rear cushion or shock absorber units 23 and the side of frame 21. The fitting piece 24 of unit 23 and the flat part 47 of the rear stay 41 are fastened together with bolt 25 so as to connect rear stay 41 to frame 21, integrally with the fastening means of cushion or shock absorber unit 23 on each of the right and left sides of the motorcycle.

The carrier member 51 is formed of a pipe or tubular member to be substantially U-shaped and bent, in much the same manner as in the above. The front half part 54 of each of the side rod parts 52 and 53 of the member 51 is bent and suspended diagonally forwardly and downwardly, and the rear half part 55, including the lateral rod part 56 in the rear end part, is formed to be horizontal. The forward portion of each of the side rod parts 52 and 53 is formed with a flat part 57 or the like. Flat part 57 is screwed and connected to each of the right and left side rod parts 46 and 45 of the rear stay 41 with a bolt so as to be integral. A plurality of lateral rods 58 are provided to cross between the right and left side rod parts of the rear half part 55 of the carrier member 51. A supporting rod 59 is provided so as to cross the side rod parts 52 and 53 in the intermediate part between the front half part 54 and the rear half part 55, and is suspended diagonally rearwardly and downwardly in the intermediate part so as to contact and be disposed substantially parallel to the lateral rod part 44 of rear stay 41.

A brace member 27 is provided in advance to project from the rear part of rear fender 26, and the lateral rod part 44 of rear stay 41 is mounted on a semi-circular concave part 29 of brace member 27, and supporting rod 59 of carrier member 51 is mounted on this part 44. A gripping metal piece 30 which is inverted U-shaped on the sides, is made to cover both parts 44 and 59 on the front and rear from above, is fitted in the front and rear parts of the lower end respectively to the front and rear surfaces of brace member 27, and is screwed and fastened with a nut 32 by passing a bolt 31 through a hole 28 (FIG. 3) so as to integrally connect both parts 44 and 59 to fender 26.

Accordingly, as set forth above, rear carrier 40 is connected in the two places of the right and left front end parts to the motorcycle frame sides, and in the intermediate part or rear part onto the rear fender of the motorcycle.

Rear stay 41 and carrier member 51 forming the rear carrier 40 are connected with each other through the bolts 33 and therefore pivotally move with the bolts 33 as pivot points so that the parts 44 and 59 may be butted with each other simply and effectively.

Figure 5:
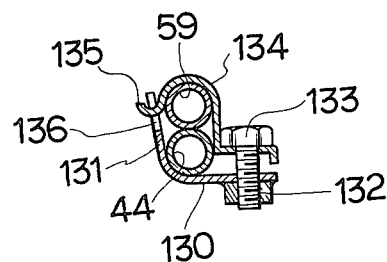
FIG. 5 is the same view as in FIG. 3, showing a modified embodiment fitted to the fender.

In FIG. 5 there is shown another embodiment of fitting the above-mentioned parts 44 and 59 to the fender 26. A fitting piece 130 having a rising part 131 is connected in advance onto the rear fender 26 and a bolt 133 is screwed to a nut 132 forming a boss of the fitting piece 130. A pressing piece 134 is fitted in advance to the bolt 133 and an engaging part 135 provided at the tip of pressing piece 134 is engaged with an engaging hole 136 made in the rising part 131 of fitting piece 130. Both above-mentioned parts 44 and 59 are fitted in advance between these pieces 130 and 134 and are fastened therein with the bolt 133 so as to be connected with each other. Thus, both parts 44 and 59 can be connected to the rear fender 26 in this manner.

Figure 6:
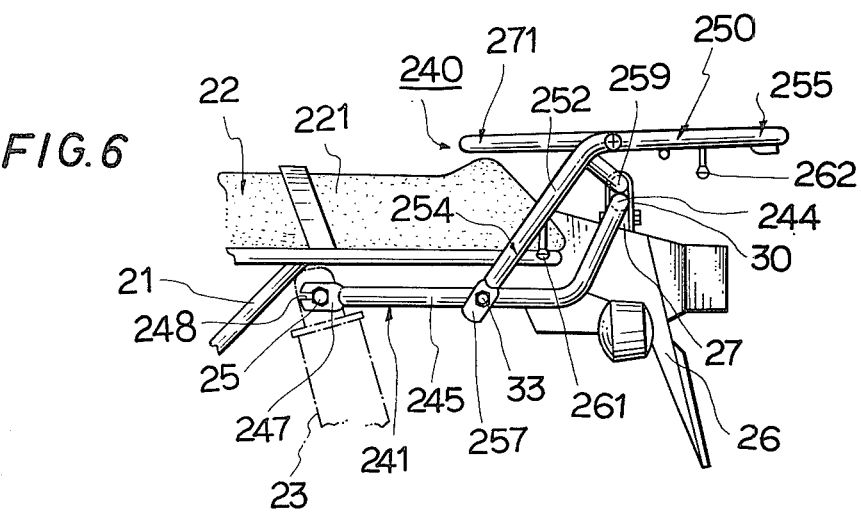
FIG. 6 is a side view of a rear carrier of a second embodiment of the present invention, shown fitted to the rear part of a motorcycle.
Figure 7:
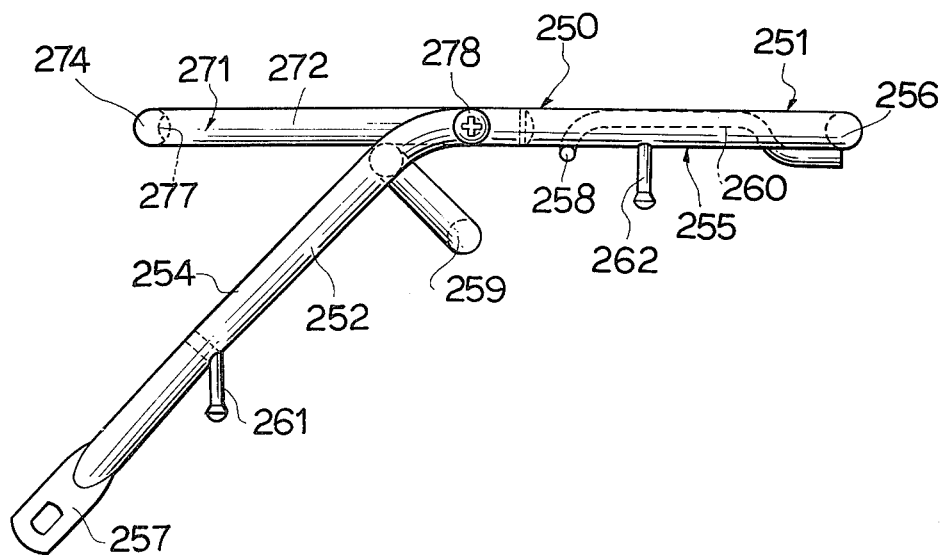
FIG. 7 is a magnified side view of only the rear carrier with the sub-frame extended.

In FIGS. 6 through 10 there is shown a second embodiment of the rear carrier device according to the present invention. A rear carrier 240 is as shown in the side view in FIG. 6 and comprises a rear stay 241 and a carrier member 250. FIG. 7 shows a side view of only the carrier member 250, and FIG. 8 shows a plan view of the same.

In this embodiment, the parts and fitting members attached to the motorcycle side are the same as are mentioned above with regard to FIGS. 1–4, and therefore the same reference numerals are used to indicate respectively the same parts.

The rear stay 241 is of exactly the same structure as rear stay 41 described above. A pipe member is formed to be generally bent U-shaped and is integrally screwed and connected through bolts 25 with the fitting pieces 24 of cushion or shock absorber units 23 in slots 248 in flat parts 247 of the front ends of right and left side rod parts 246 and 245. A lateral rod part 244 at the rear end is provided so as to bridge over the rear part of fender 26.

A rear carrier member 250 comprises a main frame 251 and a sub-frame 271. The main frame is generally U-shaped and the front half parts 254 of the right and left parts 253 and 252 are bent and suspended diagonally downwardly and are screwed and connected in the right and left flat parts 257 at the front ends to the horizontal intermediate parts of the right and left side rod parts 245 of the rear stay 241 through bolts 33. The rear half part 255 is extended rearwardly of seat 22 and is integrally provided with a lateral rod 256 at the rear end thereof. A lateral rod 258 crossing the right and left side rod parts 253 and 252 is provided in front of the lateral rod part 256 and a plurality, e.g., two parallel longitudinal rods 260 connecting lateral rod 258 and rear lateral rod 256 with each other are provided between them. Further, a crossing and downwardly bent and projected supporting part 259 is provided in the intermediate part of the main frame 251. In the same manner as is mentioned above, supporting part 259 and lateral rod part 244 of rear stay 241 are butted with each other on the brace member 27 on the rear fender 26. The metal piece 30 is made to cover from above and is screwed to brace member 27 to bind both parts 244 and 259. Band locking rods 261 and 262 are provided to project downwardly on the right and left respectively of the front half part and rear half part of main frame 251.

The sub-frame 271 is fitted to main frame 251. Sub-frame 271 is formed of a pipe member to be generally U-shaped, is set to be of an outside dimension somewhat smaller than the dimension of rear half part 255 of main frame 251 and to be of a shape conforming to the rear half part 255 so as to fit inside it. A lateral rod 275 is laterally set between the tip parts of the right and left side rod parts 273 and 272 of sub-frame 271 and is exposed in both end parts out of the outside surfaces of side rod parts 273 and 272 which are then inserted between the side rod parts 253 and 252 of the main frame. Pins 278 are inserted respectively from the outsides of the intermediate parts of right and left side rod parts 253 and 252 of main frame 251 and are screwed in the tip screw parts to both ends of lateral rod 275 to fix the lateral rod 275. Thus, sub-frame 271 becomes pivotally movable with respect to the side rod parts of the main frame with the pins 278 as pivot points. A plurality of parallel longitudinal rods 276 are provided between lateral rod part 274 of sub-frame 271 and lateral rod 275. An engaging part 277 is formed by recessing the inside of the middle part of lateral rod part 274 and a locking piece 261 to be engaged with engaging part 277 is provided inside the middle part of lateral rod part 256 of main frame 251 (FIG. 8).

In the above, sub-frame 271 is of such dimensions as to be pivotally fitted to main frame 251 so that, in case the sub-frame 271 is not required, it may be rotated rearwardly with the pins 278 as pivot points. Thereby, sub-frame 271 will be housed within the rear half part 255 of main frame 251 in a position of sub-frame 271, will not project over the rear part 221 of seat 22 and will remain extended rearwardly of rear seat part 221. In this housed state, the engaging part 277 of lateral rod part 274 of sub-frame 271 will fit into locking piece 261 provided on lateral rod part 256 of main frame 251 parallel with sub-frame 271, both parts 274 and 256 will be engaged and held parallel to each other, and sub-frame 271 will not stagger with respect to main frame 251, even with vibration such as by running of the motorcycle.

When housed, the rear carrier according to the invention will be of a length equal to substantially half the developed and extended length, will be able to carry a load mountable with such size, will not extend over the rear part 221 of seat 22 and therefore will not interfere with the ride on this rear seat part.

This retracted state is shown in full line in FIG. 9 and the engaging part of both members 251 and 271 is shown in FIG. 10.

In case the size of the load to be carried is larger, sub-frame 271 will be lifted and locking piece 261 and engaging part 277 will be disengaged from each other easily because they are only fitted to each other. Sub-frame 271 thus made free will be raised by being rotated with the pins 278 as pivot points and will be made to fall on the rear part 221 of seat 22 into a second position of sub-frame 271. The lateral rod part 274 of sub-frame 271 will be mounted over the rear seat part 221 and the rear carrier will be of a length equal to the combination of rear half part 255 of main frame 251 and sub-frame 271, so as to be able to carry a larger load. This extended state is shown in FIGS. 6, 7 and 8.

Thus, as required, the length of the rear carrier can be extended or retracted so as to conform to the desired use of the rear carrier and to accommodate various size loads.

The above embodiments of the present invention have been described with regard to motorcycles, however, it should be understood that the rear carriers of the present invention can be applied to bicycles.

I claim:

1. A rear carrier device for a cycle, comprising:
a generally U-shaped rear stay member;
said rear stay member being connected in the right and left front end parts thereof to the sides of the cycle frame, together with the fastening means of the right and left rear cushion or shock absorber units of said cycle;
said device including an intermediate part and a rear part extending substantially over a rear fender of said cycle;
a suspended part provided in said intermediate part of said device, said suspended part being connected to said rear fender of said cycle;
a carrier member connected in the forward side portions thereof respectively to both side parts of said stay;
said carrier member comprising a main frame connected with said rear stay and a sub-frame pivotally fitted to said main frame and formed so as to be selectively rotated between a first position and a second position relative to said main frame;
said sub-frame being provided with a general dimension which is smaller than the dimension of said main frame;
said first position of said sub-frame comprising a position wherein said sub-frame is housed within said main frame and forms a substantially flat carrying surface with said main frame; and
said second position of said sub-frame comprising a position wherein said sub-frame is extended in a direction substantially opposite to said first position, on the seat side of said cycle, to substantially increase the size of said substantially flat carrying surface.

2. A rear carrier device according to claim 1, wherein:
said rear stay includes a lateral rod part, said lateral rod part being generally U-shaped in the rear end part thereof and being adapted to bridge over the rear part of said rear fender;
said main frame of said carrier member includes a fitting structure, said fitting structure including said suspended part of said device; and
said suspended part comprises a supporting part of said fitting structure adapted to cross a part of said main frame and being suspended substantially downwardly, said suspended supporting part being adapted to be disposed substantially adjacent said lateral rod part of said rear stay when said lateral rod part is disposed over said rear fender.

3. A rear carrier device according to claim 2, wherein:
a brace member is provided to project from said rear fender;
said lateral rod part of said rear stay is mounted so as to cross over said support member projecting from said rear fender; and
said supporting part of said carrier member is overlapped on said lateral rod part, and both said parts are connected to said rear fender brace member by suitable fastening means.

4. A rear carrier device according to claim 1, wherein:
said main frame is formed to be generally U-shaped with a lateral rod part disposed rearwardly;
said sub-frame is formed to be generally U-shaped in conformity with the shape of said main frame; and
both said main frame and said sub-frame are pivotally fitted to each other on the open side having no lateral part.

5. A carrier device according to claim 4, wherein:
engaging parts are provided respectively in the lateral rod part of said sub-frame and the lateral rod part of said main frame, said engaging parts being adapted to engage said lateral rod parts with each other when said sub-frame is disposed in said first position housed within said main frame.

6. A rear carrier device according to claim 4, wherein:
said main frame is disposed substantially rearwardly of the seat of said cycle, extended over the rear fender of said cycle; and
said sub-frame is adapted to be disposed with said lateral rod part thereof extended over the rear part of said rear seat when said sub-frame is extended into said second position thereof.

7. A rear carrier device according to claim 6, wherein:
the size of said carrying surface defined with said sub-frame in said first position housed within said main frame is substantially doubled when said sub-frame is rotated into said second position extended over the rear part of said rear seat.

* * * * *